S. STRONG.
Pavement.
No. 164,231. Patented June 8, 1875.
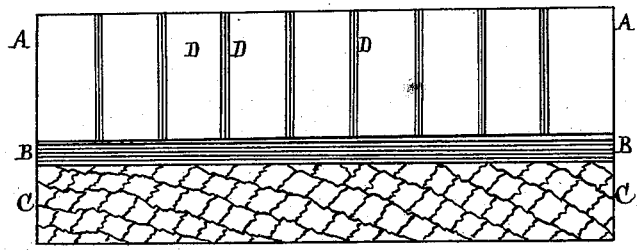
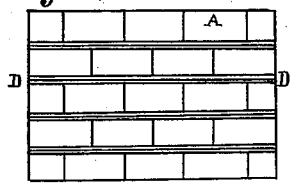 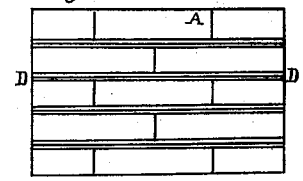
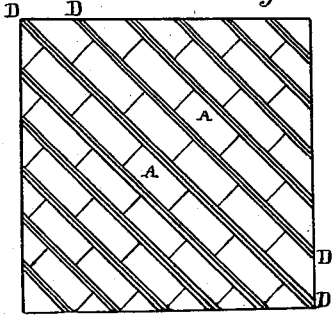
WITNESSES
Alonzo Hughes
A. Moore
Samuel Strong
INVENTOR
By J. F. Reigart
Attorney

UNITED STATES PATENT OFFICE.

SAMUEL STRONG, OF WASHINGTON, DISTRICT OF COLUMBIA, ASSIGNOR TO HIMSELF AND EBON C. INGERSOLL, OF SAME PLACE.

IMPROVEMENT IN PAVEMENTS.

Specification forming part of Letters Patent No. 164,231, dated June 8, 1875; application filed May 12, 1875.

*To all whom it may concern:*

Be it known that I, SAMUEL STRONG, of the city of Washington, District of Columbia, have invented a new and Improved Mode of Paving Streets with Hard-Burnt Pressed Bricks; and I do hereby declare the following to be an exact description thereof, reference being had to the accompanying drawings, and to the letters of reference marked thereon, making a part of this specification, in which—

Figure 1 represents hard-burnt pressed bricks, A, placed upon their ends, that rest permanently in and upon a good water-proof cement layer, B, about one inch in thickness, more or less, the cement B covering a permanent layer and foundation of concrete, C, formed and composed of small pounded stones, gravel, and cement as a solid bed for the bricks to rest upon, the concrete bed C being about six inches in depth.

Fig. 2 is a top view of the pavement or roadway, with the bricks set up on their ends. Fig. 3 is likewise a top view of the pavement with the bricks set up edgewise. Fig. 4 exhibits also a top view of the pavement, with the bricks laid diagonally across the street, either upon their edges, sides, or ends.

The nature of my invention consists in the use of hard-burnt pressed bricks A, combined with foundation C, water-proof cement B, and packing D, as herein specified; and to enable others to make and use my invention, I will describe my improved mode of paving streets as follows:

I first form a solid bed, C, (for the bricks A A to rest upon,) composed of a layer of small pounded stones, gravel, and strong cement, six inches, more or less, in thickness. I cover this bed or foundation C with a good water-proof cement, B, about one inch in thickness. Upon this I set the bricks on their edges, sides, or ends, breaking joints, and between the bricks A I fill in tar, or a strong cement, D, commonly called "grouting," the whole forming a most uniform, compact, and durable pavement, with decided advantages over all other pavements of stone, cement, or wood, and much safer and surer for the horses, and easier for carriages, without the disadvantages of hard and rough noisy stone roads, and not so easily affected by the changes of weather as the cement pavements, which the sun softens, and the horses' shoes make holes in, and frequently stick fast in, and which cause the frogs of the horses' hoofs to become heated, sore, and tender, and not so slippery as wooden or stone pavements, or so offensive after a rain from the evaporating effluvia which fill the air with the odors arising from the organic deposits collected in the fibers of the wood; but my brick pavement is the most cleanly, noiseless, and wholesome of pavements, as well as the cheapest and smoothest. The bricks being first laid dry, and on account of their exact uniformity in size, they always will conform to the curve and grade of the street, and the joints are then filled with tar, packed, and grouted in the most substantial manner, so that the pavement, for durability, will excel all other pavements, remaining good without needing repairs for at least twenty years. The hard-burnt and pressed brick, as a solid-surface pavement, rests upon a firm pounded-stone foundation, which effectually prevents the water from penetrating the brick pavement, working under it, or washing holes under it, or the bricks from sinking in the least.

I am aware that brick pavements have been used; but these I do not claim, for my invention includes a solid concrete and stone foundation for the hard brick to rest upon, completely preventing the water from undermining the pavement; therefore,

What I claim as my invention, and desire to secure by Letters Patent, is—

My improved mode of paving streets and roadways with hard-burnt pressed bricks, combined with foundation C, water-proof cement B, and packing D, as herein specified.

SAMUEL STRONG.

Witnesses:
ALONZO HUGHES,
A. MOORE.